United States Patent
Schank et al.

(10) Patent No.: US 6,602,340 B1
(45) Date of Patent: Aug. 5, 2003

(54) TRANSPARENT MEDIUM WITH ANGULAR-SELECTIVE TRANSMITTING OR REFLECTING PROPERTIES

(75) Inventors: Christina Schank, Mühltal (DE); Gerhard Pfaff, Münster (DE); Alexandra Brownfield, Miland Park, NY (US); Joachim Weitzel, Darmstadt (DE); Wolfgang Hechler, Lautertal (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/581,800

(22) PCT Filed: Dec. 7, 1998

(86) PCT No.: PCT/EP98/07933
§ 371 (c)(1),
(2), (4) Date: Jun. 19, 2000

(87) PCT Pub. No.: WO99/31023
PCT Pub. Date: Jun. 24, 1999

(30) Foreign Application Priority Data

Dec. 17, 1998 (DE) .......................... 197 56 037

(51) Int. Cl.$^7$ .............................. C04B 14/20
(52) U.S. Cl. ................. 106/415; 106/441; 106/455; 428/142; 428/144; 428/403
(58) Field of Search ................. 106/415, 441, 106/455; 428/403, 142, 144

(56) References Cited

U.S. PATENT DOCUMENTS

| 2,812,691 | A |   | 11/1957 | Boyd ........................... 88/59 |
| 3,085,473 | A |   | 4/1963  | Bourgeaux ................... 88/57.5 |
| 3,453,039 | A |   | 7/1969  | Osborne ...................... 350/260 |
| 4,089,594 | A |   | 5/1978  | Ewin .......................... 350/262 |
| 4,353,991 | A |   | 10/1982 | Van Ness et al. ............. 501/20 |
| 4,519,675 | A |   | 5/1985  | Bar-yonah ................... 350/259 |
| 5,361,163 | A | * | 11/1994 | Matsuda et al. ............. 359/452 |
| 5,362,315 | A | * | 11/1994 | Muller-Rees et al. ....... 106/493 |
| 5,650,875 | A |   | 7/1997  | Kanada et al. .............. 359/592 |
| 5,746,857 | A | * | 5/1998  | Murata et al. .............. 156/102 |
| 5,747,153 | A |   | 5/1998  | McDaniel .................... 428/324 |
| 5,851,604 | A | * | 12/1998 | Muller-Rees et al. .......... 428/1 |
| 5,945,035 | A | * | 8/1999  | Vogt et al. ................ 252/520.1 |
| 6,015,002 | A | * | 1/2000  | Biro et al. ............ 160/168.1 R |
| 6,139,962 | A | * | 10/2000 | Herget et al. ............... 428/404 |
| 6,156,115 | A | * | 12/2000 | Pfaff et al. ................. 106/403 |
| 6,221,144 | B1 | * | 4/2001 | Dietz et al. ................. 106/417 |
| 6,238,472 | B1 | * | 5/2001 | Andes et al. ................ 106/430 |

FOREIGN PATENT DOCUMENTS

| EP | 0 578 829 |   | 1/1994  |                  |
| EP | 0 727 306 |   | 8/1996  |                  |
| GB | 2 012 943 |   | 8/1979  |                  |
| WO | WO 98/53010 | * | 11/1998 | ............ C09C/1/00 |

OTHER PUBLICATIONS

Patent Abstracts of Japan vol. 097, No. 8, Aug. 29, 1997 & JP 09 104774.
Patent Abstracts of Japan vol. 017, No. 524, (m–1483) Sep. 21, 1993 & JP 05 138833.
Patent Abstracts of Japan vol. 017, No. 406 (c–1090) Jul. 29, 1993 & JP 05 078544.
Patent Abstracts of Japan vol. 014, No. 188 (c–0710) Apr. 17, 1990 & JP 02 034589.
Patent Abstracts of Japan vol. 014, No. 186 (m–0962) Apr. 16, 1990 & JP 02 034331.

* cited by examiner

*Primary Examiner*—Mark L. Bell
*Assistant Examiner*—Patricia L. Hailey
(74) *Attorney, Agent, or Firm*—Millen, White, Zelano & Branigan, P.C.

(57) ABSTRACT

The invention relates to a transparent medium comprising pearl lustre pigments having angle-selective reflection and/or transmission properties and to the use thereof, especially in transparent thermal insulation systems (TIMs).

12 Claims, No Drawings

TRANSPARENT MEDIUM WITH ANGULAR-SELECTIVE TRANSMITTING OR REFLECTING PROPERTIES

The invention relates to the use of functional pearl lustre pigments in transparent media notable for their angle-selective transmission and/or reflection properties.

Transparent thermal insulation is a technology for solar space heating. Transparent insulation materials (TIMs) combine low thermal conductivity with a high level of transmission for solar radiation. On a transparently insulated exterior wall, a TIM element is located in front of a solid wall to which a black absorber coat has been applied. This system guides the incident solar energy from the outside of a facade through a system of glass tubes brought to the wall-forming component and converted into heat. The TIM systems employed at present, although supplying good thermal insulation and energy recovery in the winter as well, have a mode of operation which nevertheless, in summer, leads to overheating of the wall and to unpleasant interior wall temperatures where there are no mechanical shading systems provided, such as roller blinds, venetian blinds, shutters, air exhaust systems, etc. In addition, the black absorber coats required for absorbing the energy restrict the decorative design options for facades.

Building facades have to date been seen only as areas for decoration; viewing facades as a useful functional surface in the context of thermal insulation promises considerable advances in terms of the insulation and heating of buildings, which is equivalent to sparing use of resources.

The sun is an inexhaustible and environmentally friendly energy source which provides us with a potential energy for heating buildings. In total, four times more energy shines on a building than is consumed as heating energy inside it.

The solar radiation which is incident on a building facade changes its angle of incidence depending on the time of day and time of year (winter/summer). In winter, the angle of incidence on a south-facing facade when the sun is at its highest (midday) is about 12°, whereas in the summer it is about 68° in Germany (depending on latitude).

The object of the present invention, then, is not only to utilize building facades as areas for decoration but also to deploy these facades as functional surfaces in regulating the heat balance of a building.

Pearl lustre pigments are no longer of interest solely for their colouring action but are increasingly being employed in functional areas. In the visible wavelength range, pearl lustre pigments exhibit selective reflection and/or transmission, properties which are responsible for the perceived colour. This wavelength-dependent reflection and/or transmission can be extended to the near infrared region and is used in part for agricultural films.

In addition, pearl lustre pigments exhibit different reflection and/or transmission depending on the angle of incidence of the incoming radiation.

A completely new functional area of use for pearl lustre pigments should therefore lie in the building sector, in facade design.

It has surprisingly now been found that transparent media comprising functional pearl lustre pigments based on platelet-shaped substrates, applied, for example, to the surface of a facade, result in angle-selective shading of the building.

The so-called functional pigments have the feature that their reflection in the visible spectral range is low under an almost perpendicular angle of incidence (e.g. up to about 12° deviation from the perpendicular, corresponding to winter conditions) while at a flat angle of incidence (i.e. up to about 68° deviation from the perpendicular, corresponding to summer conditions) it is large.

With appropriate application of these functional pigments to a facade it is possible to achieve transmission of the solar radiation, and hence heating of the facade, in winter but reflection of the solar radiation, i.e. shading of the facade, in summer.

The invention therefore provides transparent media comprising pearl lustre pigments based on platelet-shaped substrates having angle-selective reflection and/or transmission properties, characterized in that the proportion of the solar transmission level in summer (angle of incidence of solar radiation from 55 to 70°) to the solar transmission level in winter (angle of incidence of solar radiation from 5 to 20°) is in the range of 50–85%.

The angle-selective properties of the functional pigments in the transparent media are concentrated on the spectral range of solar radiation, i.e. from 0.25 to 2.5 $\mu$m. Within this wavelength range it is possible to measure the directional hemispherical degrees of transmission and reflection, for example in glass supports to which the functional pigments have been applied. From these measurements it is possible, by weighting them with the solar spectrum and/or with the light sensitivity of the human eye, to calculate solar or visual, respectively, degrees of transmission and reflection in accordance with DIN 67507.

DE-A-195 01 114 discloses a process which uses simple measures to incorporate the direct and diffuse solar irradiation present in winter into the heat balance of a house in a positive manner. The prior art describes a coating material which can be formulated to be reflective in the visible region of the electromagnetic spectrum and, by virtue of a pigment mixture, absorbent in the near infrared region. Unlike the present invention, in DE-A-195 01 114 only the solar irradiation present in winter has a positive effect on the heat balance of a house. In this context, however, it is disadvantageous that the much more intense solar irradiation in spring, summer and autumn may cause overheating of the house which can be countered only by air exhaust measures. The pigmented transparent medium in accordance with the invention has as its objective not only to utilize the solar irradiation in winter but also to protect buildings against summer overheating.

In the present invention, suitable functional pigments are all those pearl lustre pigments known to the person skilled in the art which have angle-selective reflection and/or transmission properties and whose ratio of the solar transmission level in summer (angle of incidence of the solar radiation from 55 to 70°) to the solar transmission level in winter (angle of incidence of the solar radiation from 5 to 20°) is within the range from 50 to 85%, preferably less than 80% and, in particular, not more than 75%.

To assist the angle-selective transmission and/or reflection properties of the functional pearl lustre pigments it is advisable to apply the platelet-shaped pigments to a textured substrate which in turn defines the orientation of the platelets. Given appropriate alignment of the pigment platelets, the angle-selective effect is efficiently intensified. The texturing can be achieved, for example, by applying the pigmented transparent medium to an embossed film or by embossing the transparent medium itself.

The angle-selective properties of the functional pigments are only manifested in the transparent medium when the pigment is employed in amounts of from 5 to 70% by weight, preferably from 10 to 50% by weight and, in particular, from 30 to 40% by weight. The concentration in which they are used is dependent, however, on the transparent medium employed.

Preferred functional platelet-shaped pigments are those based on metal oxide platelets, examples being those of iron oxides or alumina, of layered silicates, such as natural or synthetic mica, talc, kaolin, $SiO_2$ flakes, glass or other silicatic materials, which are coated with one or more metal oxide coats. Metal oxides used in this context include both colourless metal oxides of high refractive index, such as titanium dioxide or zirconium dioxide, and coloured metal oxides, such as chromium oxide, nickel oxide, copper oxide, cobalt oxide and, in particular, iron oxides, such as $Fe_2O_3$ or $Fe_3O_4$, for example. These platelet-shaped pigments are known, and many of them are obtainable commercially and/or can be prepared by standard techniques known to the person skilled in the art. Examples of suitable pearl lustre pigments are described in the German Patents and Patent Applications 14 67 468, 19 59 998, 20 09 566, 22 14 454, 22 15 191, 22 44 298, 23 13 331, 25 225 72, 31 37 808, 31 37 809, 31 51 343, 31 51 354, 31 51 355, 31 116 02 and 32 35 017. Functional pigments based on $SiO_2$ flakes and produced by the belt technique are the subject, for example, of WO 93/08237. Multicoat pigments are described in particular in DE-A-42 38 378, DE-A-196 18 563, DE-A-196 18 566 and DE-A-196 569. In order to increase their temperature stability and weathering resistance, the functional pigments may also have been aftercoated. It is also possible, furthermore, to employ special-effect pigments based on liquid-crystal polymers (LCPs).

Functional pearl lustre pigments employed with particular preference are electrically conductive pigments as disclosed, for example, in DE-A-38 42 330, DE-A-42 12 950 and EP 0 139 557. These pigments preferably have a tin dioxide coat doped with antimony, indium, bismuth, copper, gallium, germanium or fluorine, especially antimony. Pigments of this type are obtainable, for example, under the trade name Minatec® (produced by Merck KGaA, FRG).

The transparent medium of the invention may also comprise a mixture of different functional pigments, since in many cases the use of at least two different pigments makes it possible to obtain special effects. In that case the pigments can be mixed in any proportion, although the overall content of all functional pigments in the transparent medium should not exceed 70% by weight.

Suitable transparent media are, in particular, glass, varnishes, aqueous lacquers and plastics, especially plastics films. The transparent medium is preferably glass or a transparent polymer.

Binders employed are customary coatings binders, such as polyurethane-acrylate resins, acrylate-melamine resins, alkyd resins, polyester resins and epoxy resins, hydrocarbon resins, nitrocellulose, nitrocellulose derivatives, cellulose acetopropionate, cellulose acetobutyrate, ketone resins, aldehyde resins, polyvinyl-butyral, α-methylstyrene-acrylonitrile copolymers, polyesterimide, acrylate resin based on butyl acrylate, polyacrylic esters, especially polyacrylic butyl esters, an aqueous dispersion based on polyethylene, an aqueous dispersion based on polyethylene oxidate, an aqueous dispersion based on ethylene-acrylic acid copolymers, an aqueous dispersion based on methacrylate, one based on acrylate/styrene, a vinylpyrrolidone-vinyl acetate copolymer, or else a mixture of these dispersions and binders.

The formulation is generally prepared by introducing the functional pigment as initial charge and mixing it homogeneously with the binder and any non-opaque additives. The pigmented coating material can subsequently be applied, for example, to glass plates, aluminium panels or steel panels by means, for example, of dipping, brushing, knife-coating, printing, etc. It is also possible for the functional pigment or pigment mixture to be applied in dry form to a support, for example a thermoplastic. The support is then melted and the pigment is distributed homogeneously in the transparent medium.

Further suitable candidates as the transparent medium are all thermoplastics known to the person skilled in the art, as are described, for example, in Ullmann, Vol. 15, p. 457 ff., Verlag VCH. Examples of suitable plastics are polyethylene, polypropylene, polyamides, polyesters, polyester esters, polyether esters, polyphenylene ethers, polyacetal, polybutylene terephthalate, polymethyl methacrylate, polyvinyl acetal, polystyrene, polyurethanes, acrylonitriie-butadiene-styrene (ABS), acrylonitrile-styrene-acrylate (ASA), polycarbonate, polyether sulfones, polyether ketones, and their copolymers and/or mixtures.

The functional pigments are incorporated into the plastic by mixing the plastics granules with the pigment and then deforming the mixture under the action of heat. The plastics granules/pigment mixture is generally prepared by introducing the plastics granules as initial charge in an appropriate mixer, wetting them with any additives, and then adding the pigment and mixing the constituents. Pigmentation of the plastic is generally carried using a colour concentrate (masterbatch) or compound formulation. The resulting mixture can then be processed directly in an extruder or injection-moulding machine. The shaped articles formed on processing, such as plastic sheets, for example, exhibit very homogeneous distribution of the pigment.

The pigments can also be incorporated in glass or ceramics. In this case, the lustre pigments are mixed under gentle conditions with the glass or ceramic frits, the powder mixture is applied to a support, and firing is carried out for 5–20 minutes at temperatures from 400–1100° C., preferably at 400–850° C.

The medium according to the invention can be applied for shading and—at the same time—decorative purposes to any desired substrate materials, examples being metals such as iron, steel, aluminium, copper, bronze and brass, metal foils, and metal-coated surfaces of glass, ceramic, concrete, packaging materials, films or to other materials. The use of functional pearl lustre pigments has been found to be extremely effective, in particular, in the field of so-called transparent insulation materials (TIMS) on building facades.

The invention likewise provides TIM systems which comprise coloured absorber coats in combination with glass coatings having an angle-selective shading action.

The tranparent media of the invention are of considerable economic significance, especially by virtue of their use in TIMs, in terms of energy saving and hence the sparing use of resources.

The examples which follow are intended to illustrate the invention without restricting it.

EXAMPLES

Example 1

50 g of glass enamel frit 10049 (glass powder from Cerdec, FRG) and 50 g of screen-printing medium 80863 (binder composed of hydroxypropylcellulose ether in 2-ethoxyethanol and ethanol) from Cerdec are milled in a ball mill to particle sizes of 20–30 μm.

10 g of the milled composition are mixed homogeneously with 2.5 g of Minatec® 30 CM (conductive pigment based on $TiO_2$/mica with an (Sb,Sn) oxide layer, from Merck KGaA, FRG) and, in addition, with 20 g of screen-printing medium 80863. This screen-printable composition is printed onto a glass plate using a 51 T screen-printing fabric. The glass plate is subsequently dried at 100–130° C. for about 10–20 minutes. The printed glass plate is placed on a ceramic support and fired in an oven at 700° C. for 10 minutes.

After the glass plate has been treated, the directed hemispherical transmission and reflection is measured at different angles of incidence of the radiation in wavelength ranges from 250 to 2500 nm.

The ceramic supports in Examples 2–6 are coated in the same way as in Example 1.

Example 2

33% Minatec® 30 CM in Cerdec frit 10049

Colour formulation:

10 g of Cerdec frit 10049/screen-printing medium 80683 weight ratio 1:1 ball-milled 2.5 g of Minatec® 30 CM 20 g of screen-printing medium 80683

Printed on with 51 T screen fabric. Fired at 700° C./10 minutes.

Example 3

33% Minatec® 31 CM in Cerdec frit 10049

Colour formulation:

10 g of Cerdec frit 10049/screen-printing medium 80683 weight ratio 1:1 ball-milled 2.5 g of Minatec® 31 CM (electrically conductive pigment based on mica with an (Sn,Sb) oxide coat from Merck KGaA)

20 g of screen-printing medium 80683

Printed on with 51 T screen fabric. Fired at 700° C./10 minutes.

Example 4

33% Minatec® 40 CM in Cerdec frit 10049

Colour formulation:

10 g of Cerdec frit 10049/screen-printing medium 80683 weight ratio 1:1 ball-milled 2.5 g of Minatec® 40 CM (mixture of spherical ($BaSO_4$) and platelet-shaped (mica) pigments covered with an (Sn, Sb) oxide coat)

20 g of screen-printing medium 80683

Printed on with 51 T screen fabric. Fired at 70° C./10 minutes.

Example 5

33% Minatec® 30 CM/Iriodin® 520 ($Fe_2O_3$/mica pigment from Merck KGaA); ratio 8:2, in Cerdec frit 10049

Colour formulation:

10 g of Cerdec frit 10049/screen-printing medium 80683 weight ratio 1:1 ball-milled 2.5 g of Minatec® 30 CM/Iriodin®520, ratio 8:2

20 g of screen-printing medium 80683

Printed on with 51 T screen fabric. Fired at 700° C./10 minutes.

Example 6

33% Minatec® 30 CM/Iriodin® Orange pigment, ratio 8:2, in Cerdec frit 10049

Colour formulation:

10 g of Cerdec frit 10049/screen-printing medium 80683 weight ratio 1:1 ball-milled 2.5 g of Minatec® 30 CM/Iriodin® Orange pigment ($Fe_2O_3$/mica pigment from Merck KGaA) ratio 8:2

20 g of screen-printing medium 80683

Printed on with 51 T screen fabric. Fired at 700° C./10 minutes.

What is claimed is:

1. A transparent medium as functional surface in regulating heat balance below said surface, said medium comprising glass, a varnish, an aqueous lacquer, a plastic, a plastic film, a transparent polymer, a ceramic, a thermoplastic, or a binder, and pearl lustrous pigments having angle-selective reflection and/or transmission properties wherein the proportion of the solar transmission level in summer at an angle of incidence of solar radiation from 55 to 70° to the solar transmission level in winter at an angle of incidence of solar radiation from 5 to 20° is in the range of 50 to 85%, and wherein said medium acts as functional surface in regulating heat balance below said surface.

2. A transparent medium according to claim 1, comprising 5 to 70% by weight of said pearl lustrous pigments having angle-selective transmission and reflection properties.

3. A transparent medium according to claim 1, wherein the pearl lustrous pigments are electrically conductive-pigments.

4. A transparent medium according to claim 3, wherein the pearl lustrous pigments have an electrically conductive coat.

5. A transparent medium according to claim 1, wherein the medium is a varnish, an aqueous lacquer, a transparent polymer, a thermoplastic, a ceramic or glass.

6. A transparent medium according to claim 1, wherein the medium has been embossed.

7. A coating glass, a ceramic, a transparent insulation module, an aluminum panel, a steel panel, a stamping film or a building facade comprising a transparent medium according to claim 1.

8. A transparent thermal insulation system comprising a substrate which has been coated with a transparent medium according to claim 1.

9. A transparent medium according to claim 4, wherein the conductive coat is an antimony-doped tin dioxide coat.

10. A transparent medium according to claim 1, which has been applied to a textured substrate.

11. A transparent medium according to claim 1, which has been applied to an embossed film.

12. A transparent thermal insulation system according to claim 8, comprising a colored absorber coat and a glass coat.

* * * * *

UNITED STATES PATENT AND TRADEMARK OFFICE
CERTIFICATE OF CORRECTION

PATENT NO. : 6,602,340 B1
DATED : August 5, 2003
INVENTOR(S) : Christina Schank et al.

It is certified that error appears in the above-identified patent and that said Letters Patent is hereby corrected as shown below:

<u>Title page,</u>
Item [75], "Miland" should read -- Midland --
Item [30], Foreign Application Prioeity Data, "Dec. 17, 1998" should read -- Dec. 17, 1997 --.

<u>Column 6,</u>
Line 35, "conductive-" should read -- conductive --

Signed and Sealed this

Tenth Day of August, 2004

JON W. DUDAS
*Acting Director of the United States Patent and Trademark Office*